United States Patent [19]

Makuch

[11] 4,183,619
[45] Jan. 15, 1980

[54] CONNECTOR PIN ASSEMBLY AND METHOD FOR TERMINATING AN OPTICAL FIBER

[75] Inventor: John A. Makuch, Danbury, Conn.

[73] Assignee: Bunker Ramo Corporation, Oak Brook, Ill.

[21] Appl. No.: 806,953

[22] Filed: Jun. 15, 1977

[51] Int. Cl.[2] ............................................. G02B 5/14
[52] U.S. Cl. ............................................... 350/96.21
[58] Field of Search ................ 350/96.22, 96.20, 96.21

[56] References Cited

U.S. PATENT DOCUMENTS

| 3,914,015 | 10/1975 | McCartney | 350/96.22 |
|---|---|---|---|
| 3,923,371 | 12/1975 | Dalgleish | 350/96.21 |
| 3,960,531 | 6/1976 | Kohanzadeh et al. | 350/96.21 |
| 3,989,567 | 11/1976 | Tardy | 350/96.21 |
| 4,019,241 | 4/1977 | Logan | 350/96.21 |
| 4,047,796 | 9/1977 | Kao et al. | 350/96.21 |
| 4,050,781 | 9/1977 | Beauhaire | 350/96.21 |
| 4,056,305 | 11/1977 | McCartney et al. | 350/96.21 |
| 4,094,580 | 6/1978 | Cook et al. | 350/96.21 |

OTHER PUBLICATIONS

Fenten et al., "Connecting the Thread of Light", Electronic Connector Study Group, 9th Symposium, Oct. 1976, pp. 63-72.
C. M. Miller, "Optical Fiber Splicing Topical Meeting on Optical Fiber Transmission II, Feb. 1977, paper No. WA3.

Primary Examiner—Stewart J. Levy
Attorney, Agent, or Firm—William Lohff; F. M. Arbuckle

[57] ABSTRACT

A connector pin assembly for concentrically aligning and terminating a fiber optical cable with respect to the outer dimension of the pin includes a tubular body having two ends, a longitudinal bore extending into one end of the body and a counter bore extending into the other end of the body. The counter bore has inner walls concentric with the outer dimension of the body and communicates with the longitudinal bore. A plurality of pin members of equal dimension are within the counter bore arranged in side-by-side relation for tangential contact with the inner walls of the counter bore, tangential contact with each other, and tangential contact with an optical fiber inserted into the central passageway defined by the pin members. As a result, the optical fiber is held by the pin members concentrically with respect to the outer dimension of the tubular body.

Also disclosed is a method of terminating an optical fiber within a connector pin of the present invention and concentrically aligning the optical fiber with respect to the outer dimension of the pin.

10 Claims, 12 Drawing Figures

CONNECTOR PIN ASSEMBLY AND METHOD FOR TERMINATING AN OPTICAL FIBER

BACKGROUND OF THE INVENTION

The invention is directed generally to connectors, and more particularly to a connector pin assembly for use in terminating a fiber optic cable and concentrically aligning the cable optical fiber with respect to the outer dimension of the connector pin.

In recent years fiber optic light transmission systems, wherein a single optically conductive fiber or a multiplicity of parallel optically-conductive fibers are arranged to form a flexible light-conductive cable bundle for conveying light from one location to another, have come into increasing use, not only for providing illumination, but also for conveying data from one location to another. In the latter application, a light source is modulated with data to be transmitted at one end of the cable bundle, and the data is recovered at the other end of the cable bundle by a photo-sensitive detector. Since the data is conveyed by a medium not subject to radio frequency interference or detection, such light transmission systems are particularly well adapted for high security applications, such as found in the data processing and military communications field.

With the increasing use of fiber optic systems, the need has developed for a connector for connecting segments of light-conductive cable bundles with minimum detriment to the optical transmission path. Prior art connectors for this purpose have not been completely satisfactory, particularly where frequent connects and disconnects must be made under adverse environmental conditions, or where multiple fiber optic circuits must be connected to a single connector because of the difficulty of maintaining an accurate consistent alignment between the ends of coupled cable segments under such conditions.

It is generally well known that the tolerances are very strict in the interconnection of a pair of fiber optic cables. The terminal ends of the cables must be axially and angularly aligned and as close together as possible without touching to achieve efficient light transfer. The glass material which is commonly used as the light-conducting fiber core of the cables is very brittle, and touching of the cable terminal end faces results in abrasions to the end faces which results in consequent reduced light transfer efficiency.

Where fiber optic systems are used for conveying data from one location to another, it is well known that as the data frequency is increased, the diameters of the fiber optic cables must decrease. Data transmission frequencies have increased to a point where only a single optical fiber is utilized for conveying the data. As a result, although the tolerance percentages for interconnecting fiber optic cables comprising a single optical fiber remains the same as for fiber optic bundles to achieve efficient light transfer, the absolute tolerance magnitudes decrease greatly.

It has been found that extremely strict axial and angular alignment between a pair of fiber optic cables can be achieved by terminating the optical fibers of the cables in connector pin assemblies in such a way that the optical fibers are concentrically aligned with respect to the outer dimensions of the connector pins. When a pair of such connector pins are concentrically and accurately aligned, the ultimate result is that the optical fibers will likewise be angularly and axially aligned for efficient light transfer.

Many techniques have been devised for aligning the optical fibers of fiber optic cables. However, these prior techniques have not been totally satisfactory.

One such technique is described in a paper entitled "Connecting The Thread of Light" by Kenneth Fenton and Ronald McCartney, published by ELECTRONIC CONNECTOR STUDY GROUP, INC., which was presented on Oct. 20, 1976 at the Ninth Annual Symposium Proceedings at Cherry Hill, New Jersey. The alignment technique therein described utilizes three rods of equal diameter which are arranged in an equilateral triangle configuration parallel with the axis of the fiber core. The rod diameter is selected so that the three rods come into intimate contact with each other and the minimum diameter fiber at exactly the same time to trap the fiber, within the interstices of the three rods.

A tapered entry tube constructed of elastomeric material is utilized for holding the optical fiber within the rods. The optical fiber is placed within the three rods and then housed within the tapered tube. The three rods project from one side of the tube and an O-ring provides terminating pressure.

Although the authors have indicated limited success, there are three main shortcomings of this termination technique. The first shortcoming, as identified by the authors themselves, is that this termination technique is not suitable for terminating stepped index profile plastic clad pure fused silica core fibers. Secondly, because the three rods project from the connector, there is no protection against contamination for the fiber when the connector is unmated. Lastly, because the connector is formed from a plastic material, the connector has potential environmental temperature and chemical instabilities.

It is therefore a general object of the present invention to provide a new and improved connector pin assembly for concentrically aligning and terminating a fiber optic cable with respect to the outer dimension of the connector pin.

It is a further object of the present invention to provide a new and improved connector pin assembly which provides protection against contamination for the terminated optical fibers when the connector is unmated.

It is a further object of the present invention to provide a connector pin assembly which is capable of terminating any one of the known types of fiber optic cables and providing environmental stability to the optical fiber termination.

It is a still further object of the present invention to provide a new and improved method of concentrically aligning and terminating an optical fiber within a connector pin assembly.

SUMMARY OF THE INVENTION

The invention provides a connector pin assembly for concentrically aligning and terminating a fiber optic cable with respect to the outer dimension of the pin comprising a tubular body having two ends, a longitudinal bore extending into one end of the body and a counter bore extending into the other end of the body. The counter bore has inner walls concentric with the outer dimension of the body and communicates with the longitudinal bore. The connector pin assembly also includes a plurality of pin members of equal dimension arranged within the counter bore in side-by-side relation for tangential contact with the inner walls of the counter bore, tangential contact with each other, and tangential contact with an optical fiber inserted into the central passageway defined by the pin members. As a result, the optical fiber is held concentrically with respect to the outer dimension of the tubular body.

The invention also provides a method of terminating an optical fiber within a connector pin and concentrically aligning the optical fiber with respect to the outer dimension of the pin, wherein the pin includes a tubular body having a rear end and a forward end, a longitudinal bore extending into the rear end, and a counter bore extending into the forward end communicating with the longitudinal bore and concentrically dimensioned with respect to the outer dimension of the pin. The method comprises the steps of inserting a plurality of equally dimensioned pin members into the counter bore, aligning the pin members in side-by-side relation with the pin members being in tangential contact with the counter bore and in tangential contact with each other, inserting the optical fiber to be terminated into the longitudinal bore, guiding the optical fiber through the longitudinal bore into the counter bore and the central passageway defined by the pin members, flowing adhesive material into the counter bore, and allowing the adhesive material to cure to secure the optical fiber within the central passageway and the pin members within the counter bore.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
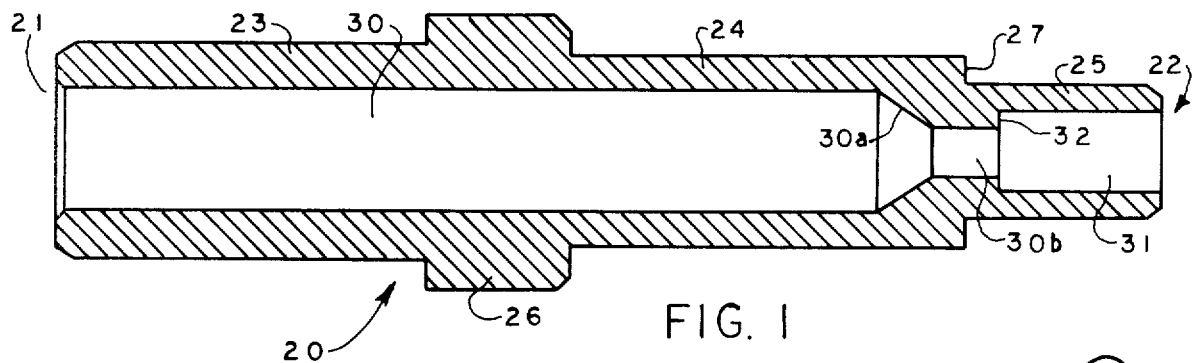
FIG. 1 is a cross-sectional view of a connector pin embodying the present invention.

Referring now to FIG. 1, FIG. 1 shows a connector pin which may be utilized in practicing the present invention. The pin generally designated 20 comprises a stainless steel tubular body having a rear end 21 and a forward or terminating end 22. The tubular body 20 includes a major diameter portion 23, an intermediate diameter portion 24, and a minor diameter portion 25. Between major diameter portion 23 and intermediate diameter portion 24 is an annular flange 26 which may be received into a correspondingly shaped annular slot of a connector housing (not shown). One such connector housing is fully described and claimed in copending application Ser. No. 788,985, filed Apr. 19, 1977, in the names of John A. Makuch and Melvin Gordon, now U.S. Pat. No. 4,140,367 issued Feb. 2, 1979, which is assigned to the assignee of the present invention. Between the intermediate diameter portion 24 and the minor diameter portion 25 is a forward shoulder 27 defined by those two portions which adapts the connector pin assembly of the present invention for mating interconnection with a like pin structure in a manner as described and claimed in copending patent application Ser. No. 788,820, filed Apr. 19, 1977, in the names of John A. Makuch and Henry R. Fredlund, Jr., now U.S. Pat. No. 4,140,366 issued Feb. 2, 1979, and which is assigned to the assignee of the present invention. The connector assembly described therein will be more fully referred to hereinafter.

Pin 20 also includes a longitudinal bore 30 which extends into the rear end of the tubular body and a counter bore 31 which extends into the forward end of the tubular body. Longitudinal bore 30 includes conical sidewalls 30a which converge towards the forward end of pin 20 and a reduced diameter portion 30b which communicates with the counter bore 31. As a result, counter bore 31 communicates with the longitudinal bore 30.

The counter bore 31 is dimensioned concentrically with the outer dimension of the minor diameter portion 25 and is also greater in diameter than the reduced diameter portion 30b of longitudinal bore 30. The counter bore 31 and the reduced diameter portion 30b of longitudinal bore 30 define an annular shoulder portion 32 which is forward facing.

Figure 2:
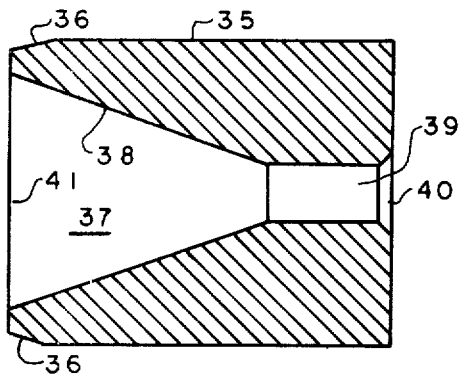
FIG. 2 is a cross-sectional view, to an enlarged scale, of an insert member embodying the present invention.

The counter bore 31 is dimensioned for receiving the insert member 35 shown in FIG. 2. The insert member 35, preferably formed from stainless steel, has an outer diameter corresponding to the diameter of the counter bore 31 for being received by the counter bore 31. Insert member 35 includes tapered side portions 36 which assist in the inserting of the insert member into counter bore 31. Insert member 35 also includes a guide bore 37 which has a major opening 41 and converging sidewalls 38 converging in the direction towards the forward end of pin 20. The guide bore also includes a channel 39 which terminates in a slightly increased diameter opening 40. With the guide bore 37 being so constructed, insert member 35 assists in the threading of an optical fiber into the longitudinal bore in a manner to be described more fully hereinafter.

Figure 3:
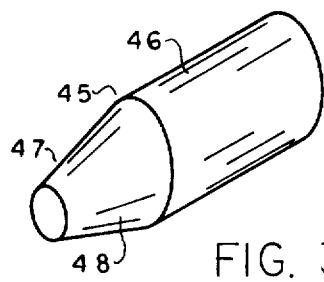
FIG. 3 is a perspective view, to an enlarged scale, of a pin member which may be used in practicing the present invention.
Figure 4:
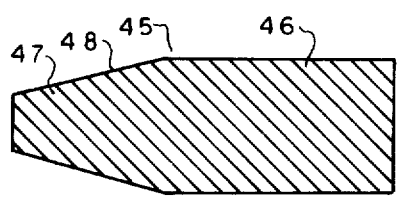
FIG. 4 is a cross-sectional view, to an enlarged scale, of the pin member of FIG. 3.

FIGS. 3 and 4 show a pin member which may be utilized in practicing the present invention. The pin member 45 is formed from a solid tubular body preferably consisting of stainless steel. Pin member 45 includes a cylindrical portion 46 and a conical end portion 47. The conical end portion 47 has a conical outer surface 48 which decreases in diameter in the rearward direction.

Figure 5:
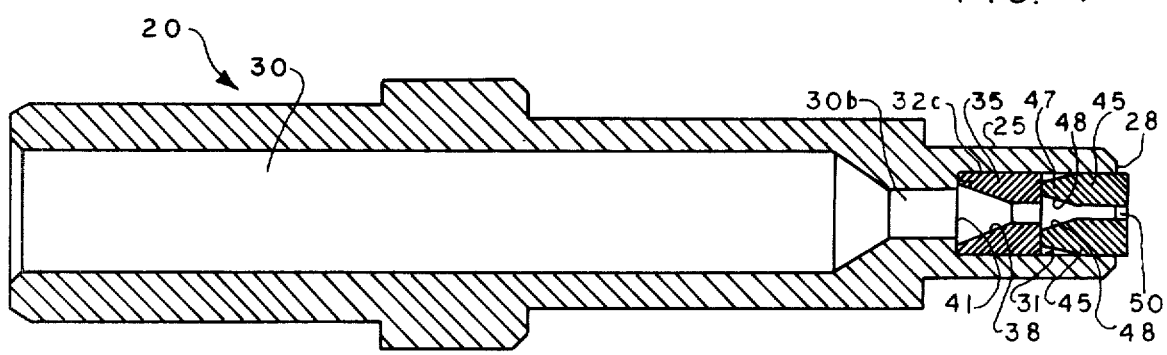
FIG. 5 is a cross-sectional view of a connector pin assembly embodying the present invention at one stage of its assembly.
Figure 6:
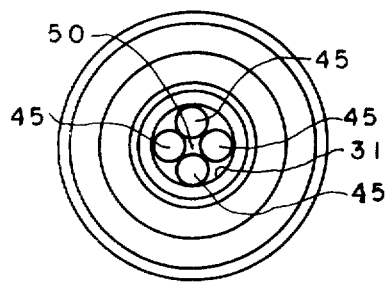
FIG. 6 is an end view of the connector pin assembly of FIG. 5.

FIGS. 5 and 6 illustrate the connector pin assembly after one stage of its assembly. Insert member 35 and four of pin members 45 have been inserted into the counter bore 31. The insert member 35 as shown, is within the counter bore between the forward shoulder 32 defined by the reduced diameter portion 30b of longitudinal bore 30 and counter bore 31, and the four pin members 45. The four pin members 45 are arranged in side-by-side relation and, as best seen in FIG. 6, are arranged to be in tangential contact with counter bore 31 and tangential contact with each other. Th pin members 45 are also of equal dimension and define a central passage 50. Because the counter bore is concentrically dimensioned with respect to the outer dimension of the minor diameter portion 25 of pin 20 and because the pin members 45 are of equal dimension, the central passageway 50 will be centrally located within the pin 20 and an optical fiber inserted therein will be concentrically aligned with the outer dimension of the pin 20.

The major opening 41 of insert member 35 defined by the conical sidewalls 38 communicates with the reduced diameter portion 30b of longitudinal bore 30. The pin members 45 are also arranged such that their conical end portions 47 point in the rearward direction so that the conical sidewalls 48 form converging guide walls for guiding an optical fiber into the central passageway 50. It is also noted that the forward ends of pin members 45 extend beyond the terminal end face 28 of pin 20.

Figure 7:
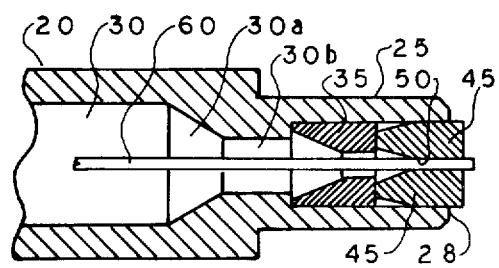
FIG. 7 is a partial cross-sectional view of the connector pin assembly of FIG. 5 at a further stage of its assembly.
Figure 8:
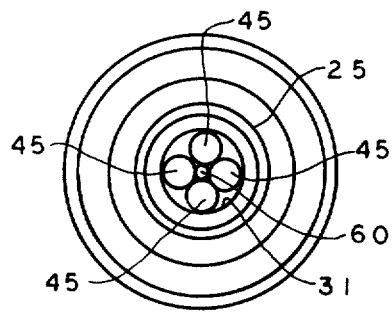
FIG. 8 is a front end view of the connector pin assembly of FIG. 7.

FIGS. 7 and 8 illustrate the connector pin assembly after an optical fiber 60 has been inserted into the rear end of longitudinal bore 30 and threaded through the longitudinal bore, the insert member 35, and the central passageway 50 defined by the pin members 45. The optical fiber 60 is threaded past the forward end face 28 of the pin 20.

The diameter of the counter bore, and the diameter of the pin members 45 are selected so that the optical fiber 60 will be in tangential contact with the pin members 45 as shown in FIG. 8. This tangential relation between the optical fiber 60, the pin members 45, and the counter bore 31 is preferred to assure that the optical fiber 60 will be concentrically aligned with respect to the outer dimension of minor diameter portion 25 of pin 20.

Figure 9:
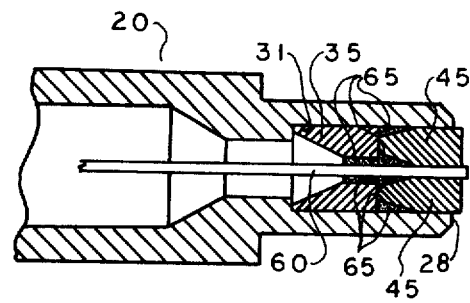
FIG. 9 is a partial cross-sectional view of the connector pin assembly of FIG. 5 at a still further stage in the assembly of the connector pin assembly and the termination of an optical fiber.
Figure 10:
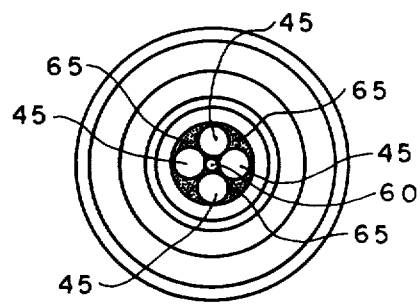
FIG. 10 is an end view of the connector pin assembly as shown in FIG. 9.

After the optical fiber is threaded through the pin assembly as shown in FIGS. 7 and 8, a suitable adhesive such as epoxy is caused to flow into the forward end of the pin to permanently seal the optical fiber 60 in place. The connector pin assembly after this operation is illustrated in FIGS. 9 and 10. It has been found in practice that the epoxy will flow into the forward end of the pin assembly by way of capillary action. The epoxy 65 is then allowed to cure, and as a result, the insert member 35, the pin members 45, and the optical fiber 60 are permanently secured and terminated within the counter bore 31.

Figure 11:
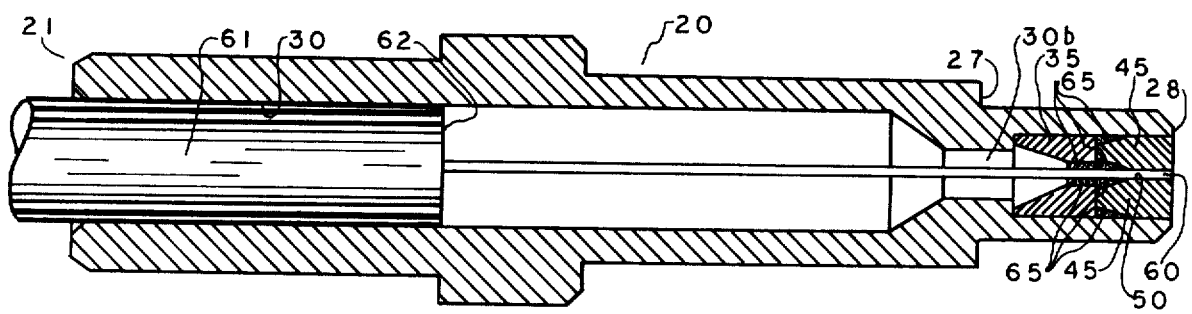
FIG. 11 is a cross-sectional view of a completely assembled connector pin assembly and terminated optical fiber assembled in accordance with the present invention.

After the epoxy 65 has fully cured, the portions of the pin members 45 and optical fiber 60 which extend beyond the terminal end face 28 of pin 20 are ground off and polished into a smooth surface with the terminating end face 28 of pin 20. The resulting completed pin assembly is shown in FIG. 11. If a fiber optic cable of the type having an outer protective sleeve 61 is to be terminated, the sleeve 61 may be removed at a point sufficiently spaced from the tip of the optical fiber to assure that the optical fiber will thread through the reduced diameter portion 30b, and the central passageway 50 defined by the pin members 45. For example, the protective sleeve 61 as shown in FIG. 11 has been removed at 62.

The invention therefore provides a new and improved connector pin assembly for terminating and aligning an optical fiber concentrically with the outer dimension of the connector pin. While four pin members have been shown and described as the preferred embodiment herein, it must be understood that any number of pin members greater than two pin members may be utilized in practicing the present invention. Because the optical fiber is entirely enclosed within the tubular body of the pin, it is protected from dirt and other extraneous matter which may degrade light transfer between a pair of optical fiber terminated according to the present invention. It has also been found through practice, that any type of single optical fiber cable may be terminated in accordance with the present invention. Lastly, because the tubular body, the insert member, and the pin member are configured from stainless steel, the resulting connector pin assembly will not be subject to temperature or chemical environmental instabilities. Of course, other stable materials may also be used.

The connector pin assembly of the present invention is most suitably adapted for interconnecting a pair of optical fibers in the manner fully disclosed and claimed in the aforementioned patent application Ser. No. 788,820. The connector assembly there described includes a pin having a reduced diameter front end portion having a forward facing annular shoulder such as shoulder 27. A resilient sleeve is dimensioned for being tightly received over the reduced diameter portion of each pin and is of a predetermined length so that when the ends of the resilient sleeve abut the forward facing shoulders, the terminal end faces, such as terminal ends 28, will be a controlled and predetermined spacing to effect efficient light transfer. Because the counter bore 31 is concentrically dimensioned with respect to the outer dimension of the pin 20, and because the pin members are of equal diameter and tangential contact with the counter bore, with each other, and with the optical fiber 60, the optical fiber of each pin will be accurately aligned with one another both axially and angularly to effect efficient light transfer.

Figure 12:
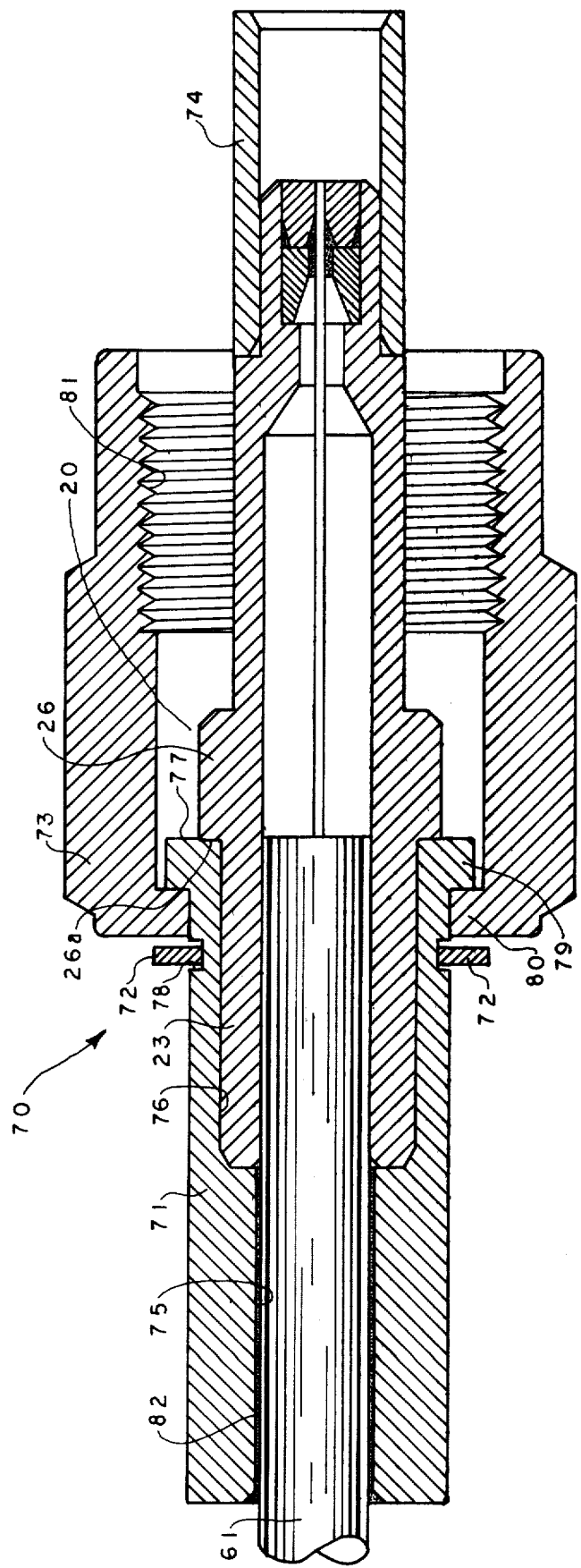
FIG. 12 is a cross-sectional view of a complete connector incorporating the connector pin assembly of the present invention.

FIG. 12 shows a complete fiber optic cable connector 70 incorporating the connector pin assembly of FIG. 11. It includes the complete connector pin assembly, a rear body portion 71, a retaining ring 72, a coupling nut 73, and a sleeve 74.

The rear body portion 71 is tubular and includes a rear bore portion 75 dimensioned for receiving the fiber optic cable sleeve 61, and a forward bore 76 dimensioned for tightly receiving the major diameter portion 23 of connector pin 20. The rear body portion 71 has a forward annular face 77 which abuts the rearwardly facing shoulder 26a of annular flange 26.

The rear body portion 71 has an annular slot 78 which is dimensioned for receiving retaining ring 72 to axially fix the retaining ring therein. The retaining ring 72 and an annular flange 79 coact to confine coupling nut 73 on the forward end of the rear body portion 71. To that end, coupling nut 73 includes a reduced inner diameter portion 80 which is confined between retaining ring 72 and the annular flange 79, and a major inner diameter portion 81. Major diameter portion 81 carries suitable inner threads for threading engagement with a complementary connector. As fully described and claimed in the aforementioned copending application, sleeve 74, preferably formed from resilient material, is tightly received on the forward end of pin 20 and arranged to receive the forward end of the pin carried by the complementary connector in the same manner. The sleeve aligns and spaces the terminating end faces of the fiber optic cables for efficient light transfer.

Strain relief is afforded to the cable by adhering it to the rear body portion. A suitable adhesive, such as epoxy 82 is caused to flow into the rear bore 75 around the cable and allowed to cure. In this manner, the cable is firmly fixed to the connector. Strain relief may also be provided by crimping the cable to the rear body portion in a known manner.

While a particular embodiment of the invention has been shown as described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. A connector pin assembly for concentrically aligning and terminating an optical fiber of a fiber optic cable with respect to the outer dimension of said pin comprising:
    a body having a forward end and a rear end, an opening extending from said forward end to said rear end completely through said body, said opening being defined along at least a portion of its length extending inwardly from said forward end by an inner wall, said inner wall being concentric with the outer dimension of said forward end of said body; and
    a plurality of pin members within said opening arranged in side-by-side relation to define a central passageway, said pin members being dimensioned for substantially tangential contact with said inner wall, substantially tangential contact with each other, and locating said optical fiber in said central passageway such that said optical fiber is held concentrically with respect to the outer dimension of said forward end of said body.

2. A connector pin assembly as defined in claim 1, further comprising adhesive material between said pin members and said inner wall and between said pin members and said optical fiber.

3. A connector pin assembly as defined in claim 1, wherein said plurality of pin members comprises four pin members.

4. A connector pin assembly as defined in claim 1, wherein each of said pin members comprises a solid tubular body having a conical end portion, and wherein said pin member conical end portions are arranged in side-by-side relation to provide converging guide walls for guiding an optical fiber into said central passageway.

5. A connector pin assembly as defined in claim 4, wherein said opening includes a reduced diameter portion communicating with said portion of its length extending inwardly from said forward end to form a shoulder portion therewith and wherein said connector pin assembly further includes an insert member having an outer dimension corresponding to the inner dimension of said opening along said portion of its length extending inwardly from said forward end such that said insert member is adapted to be received by said opening portion, said insert member being within said opening along said portion of its length extending inwardly from said forward end between said shoulder portion and said pin members, and having a guide bore for directing an optical fiber from said opening into said central passageway.

6. A connector pin assembly as defined in claim 5, wherein said guide bore comprises a major opening communicating with said opening in said body, said guide bore having sidewalls converging in the direction of said pin members and terminating in a minor opening adjacent said pin members.

7. A connector pin assembly for concentrically aligning and terminating an optical fiber of a fiber optic cable with respect to the outer dimension of said pin comprising:
    a generally cylindrical body having a rear end and a forward end, a longitudinal bore extending into said rear end of said body and terminating in a reduced diameter portion, and a counter bore extending into said body from said forward end, said counter bore being greater in diameter than said reduced diameter portion and being defined by an inner wall concentric with the outer dimension of said body, said counter bore communicating with said reduced diameter portion and forming an annular shoulder therewith;
    a plurality of pin members within said counter bore arranged in side-by-side relation to define a central passageway, said pin members being of equal dimension and dimensioned for substantially tangential contact with said inner wall defining said counter bore, substantially tangential contact with each other, and locating said optical fiber in said central passageway defined by said pin members such that said optical fiber is held concentric with the outer dimension of said body, said pin members including a conical end portion having conical surfaces converging in the direction of said rear end to form converging guide walls to said central passageway; and
    an insert member having an outer diameter dimensioned so as to correspond to the dimension of said counter bore, said insert member being within said counter bore between said annular shoulder and said pin members, and including a guide bore communicating with said reduced diameter portion and said central passageway for directing said optical fiber from said longitudinal bore into said central passageway during insertion thereof.

8. A method of terminating an optical fiber within a connector pin and concentrically aligning said optical fiber with respect to the outer dimension of said pin, wherein said pin includes a body having a rear end, a forward end, an opening extending from said forward end to said rear end completely through said body, said opening being defined along at least a portion of its length extending inwardly from said forward end by an inner wall, said inner wall being concentrically dimensioned with respect to the outer dimension of said forward end of said body, said method comprising:
    inserting a plurality of pin members into said opening;
    aligning said pin members in side-by-side relation with said pin members being in substantially tangential contact with said inner wall and in substantially tangential contact with each other to define a central passageway;

inserting said optical fiber to be terminated into said opening;

guiding said optical fiber through said opening along said central passageway defined by said pin members;

flowing adhesive material into said opening along said portion of its length extending inwardly from said forward end of said body; and allowing said adhesive material to cure to secure said optical fiber within said central passageway and said pin members within said opening.

9. The method as defined in claim 8 wherein said pin members are inserted into said opening with their ends extending beyond said forward end of said pin, said optical fiber is guided pass said forward end, and said pin members and said optical fiber are ground and polished into a smooth surface after said adhesive material has cured.

10. The method as defined in claim 9 further comprising the step of inserting a guide insert into said opening prior to inserting said pin members into said opening, wherein said guide insert includes a guide bore for assisting in guiding said optical fiber into said central passageway.

* * * * *